_(12)_ United States Patent
Sim

(10) Patent No.: US 10,035,506 B2
(45) Date of Patent: Jul. 31, 2018

(54) DRIVING ASSISTANCE APPARATUS AND DRIVING ASSISTANCE METHOD

(71) Applicant: MANDO CORPORATION, Pyeongtaek-si, Gyeonggi-do (KR)

(72) Inventor: Sang Kyun Sim, Anyang-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 94 days.

(21) Appl. No.: 15/257,916

(22) Filed: Sep. 7, 2016

(65) Prior Publication Data

US 2017/0072950 A1  Mar. 16, 2017

(30) Foreign Application Priority Data

Sep. 14, 2015 (KR) .......................... 10-2015-0129485

(51) Int. Cl.
*B62D 6/00* (2006.01)
*B60W 30/09* (2012.01)
*B60W 10/184* (2012.01)
*B60W 10/20* (2006.01)

(52) U.S. Cl.
CPC .......... *B60W 30/09* (2013.01); *B60W 10/184* (2013.01); *B60W 10/20* (2013.01); *B60W 2550/10* (2013.01); *B60W 2550/302* (2013.01); *B60W 2710/18* (2013.01); *B60W 2710/20* (2013.01)

(58) Field of Classification Search
CPC .... B60W 30/09; B60W 10/184; B60W 10/20; B60W 2550/10; B60W 2710/18; B60W 2710/20
USPC ............ 701/41, 29, 23, 25, 46, 96; 340/903; 342/357.25
See application file for complete search history.

(56) References Cited

U.S. PATENT DOCUMENTS

| | | | | |
|---|---|---|---|---|
| 9,598,078 | B2 * | 3/2017 | Moran | ................ B60W 30/09 |
| 2004/0066022 | A1 * | 4/2004 | Mori | ................ B60N 2/42745 280/730.1 |
| 2010/0082195 | A1 * | 4/2010 | Lee | ...................... B62D 15/025 701/25 |
| 2011/0190972 | A1 * | 8/2011 | Timmons | ............... G01C 21/34 701/31.4 |
| 2012/0330541 | A1 * | 12/2012 | Sakugawa | ......... B60W 30/0956 701/301 |
| 2013/0314503 | A1 * | 11/2013 | Nix | .................... G06K 9/00805 348/46 |
| 2014/0222280 | A1 * | 8/2014 | Salomonsson | ......... G08G 1/167 701/28 |

(Continued)

*Primary Examiner* — Shardul D Patel
(74) *Attorney, Agent, or Firm* — Hauptman Ham, LLP

(57) ABSTRACT

A driving assistance apparatus including: a first detecting unit that monitors around areas of the vehicle to detect an object; an estimating unit that tracks objects detected in at least one area among the around areas, to estimate the movement of the object; a selecting unit that selects a target object from the objects based on the estimated movement condition; a determining unit that calculates the time to collision (TTC) with the target object, and determines a level of collision risk based on the TTC; a first controller that controls a braking device if the risk corresponds to Level 2; a second detecting unit that monitors the rear of the vehicle to detect a rear object if the risk corresponds to Level 3; and a second controller that controls the braking device or a steering device based on the rear object detection.

19 Claims, 9 Drawing Sheets

(56) References Cited

U.S. PATENT DOCUMENTS

| | | | |
|---|---|---|---|
| 2014/0309806 A1* | 10/2014 | Ricci | B60Q 1/00 |
| | | | 701/1 |
| 2015/0094928 A1* | 4/2015 | Matsumura | B60W 30/143 |
| | | | 701/93 |
| 2015/0149037 A1* | 5/2015 | Lim | B60W 30/09 |
| | | | 701/41 |
| 2015/0161893 A1* | 6/2015 | Duncan | G07C 5/008 |
| | | | 701/1 |
| 2016/0039411 A1* | 2/2016 | Park | G01S 13/87 |
| | | | 701/70 |
| 2017/0044816 A1* | 2/2017 | Salter | E05F 15/73 |

* cited by examiner

DRIVING ASSISTANCE APPARATUS AND DRIVING ASSISTANCE METHOD

CROSS REFERENCE TO RELATED APPLICATION

This application claims priority from Korean Patent Application No. 10-2015-0129485, filed on Sep. 14, 2015, which is hereby incorporated by reference for all purposes as if fully set forth herein.

BACKGROUND OF THE INVENTION

1. Field of the Invention

The present embodiments relate to vehicle driving assistance technology.

2. Description of the Prior Art

In general, a rear-end collision with a preceding vehicle frequently occurs because of a driver's negligence in looking ahead or a sudden stop of the preceding vehicle while driving a vehicle. In order to reduce such a car crash, a pre-crash system has been developed, which detects the distance and the relative speed with respect to a preceding vehicle by installing, for example, radars in the vehicle to then determine the risk of collision with the preceding vehicle and warns the driver of a risk of collision according to the determined risk of collision, or controls a braking device to be operated as necessary in order to thereby minimize the damage of the vehicle and driver before collision.

The pre-crash system makes a control to automatically operate the braking device before collision in order to reduce the damage of the vehicle, and adopts an additional function of, for example, tightening the seat belt in order to reduce the damage of the driver.

However, the pre-crash system controls the vehicle according to a risk of collision caused by a relationship with a preceding vehicle, and does not control the vehicle by reflecting a risk of collision caused by a relationship with a rear vehicle that follows the same.

Thus, the pre-crash system can reduce the damage caused by a collision with a preceding vehicle, whereas it cannot reduce the damage caused by the second collision with a rear vehicle.

SUMMARY OF THE INVENTION

In this background, the purpose of the present embodiments is to provide driving assistance technology for controlling the vehicle by reflecting a risk of collision caused by a relationship with a rear vehicle.

The present embodiment, according to an aspect of the invention, provides a driving assistance apparatus that may include: a first detecting unit that is configured to monitor the front area of the vehicle, the left and right front areas of the vehicle, and both lateral areas of the vehicle in order to thereby detect an object by using one or more cameras and one or more radars; an estimating unit that is configured to track one or more objects that are detected in at least one of the front area, the left and right front areas, or both of the lateral areas in order to thereby estimate the movement of the object; a selecting unit that is configured to select a target object from the one or more objects based on the conditions containing the estimated movement; a determining unit that is configured to calculate the time to collision (TTC) with the target object, and to determine the risk of collision to be one of the three levels that are separated based on the time to collision; a first controller that is configured to partially control a braking device of the vehicle if the risk of collision with the target object corresponds to Level 2; a second detecting unit that is configured to monitor the rear area of the vehicle in order to thereby detect a rear object if the risk of collision with the target object corresponds to Level 3, which is higher than Level 2; and a second controller that is configured to control the braking device or a steering device based on whether or not the rear object is detected.

The present embodiment, according to an aspect of the invention, provides a driving assistance method that may include: a first detecting operation of monitoring the front area of the vehicle, the left and right front areas of the vehicle, and both lateral areas of the vehicle in order to thereby detect an object by using one or more cameras and one or more radars; an estimating operation of tracking one or more objects that are detected in at least one of the front area, the left and right front areas, or both of the lateral areas in order to thereby estimate the movement of the object; a selecting operation of selecting a target object from the one or more objects based on the conditions containing the estimated movement; a determining operation of calculating the time to collision (TTC) with the target object and determining the risk of collision to be one of the three separated levels based on the time to collision; a first control operation of partially controlling a braking device of the vehicle if the risk of collision with the target object corresponds to Level 2; a second detecting operation of monitoring the rear area of the vehicle in order to thereby detect a rear object if the risk of collision with the target object corresponds to Level 3 in which the risk of collision with the target object is higher than that of Level 2; and a second control operation of controlling the braking device or a steering device based on whether or not the rear object is detected.

As described above, the present embodiments may provide driving assistance technology for controlling the vehicle by reflecting a risk of collision caused by a relationship with a rear vehicle.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 1:
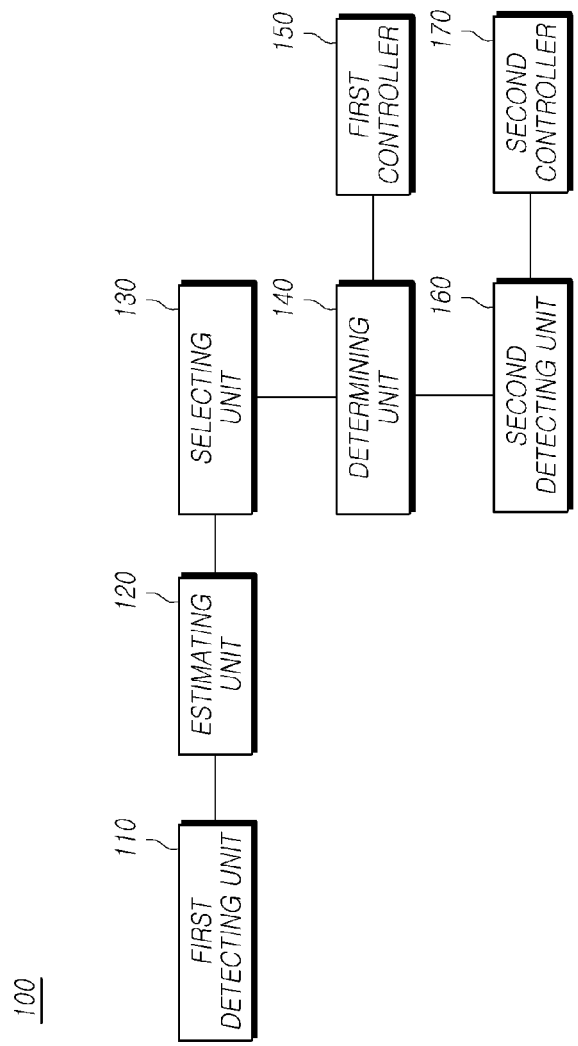
FIG. 1 is a view showing the configuration of a driving assistance apparatus, according to an embodiment.

Hereinafter, some embodiments will be described with reference to the accompanying illustrative drawings. In designating elements of the drawings by reference numerals, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may be connected to", "be coupled to", or "be in contact with" the structural elements as well as that the certain structural element is directly connected to or is in direct contact with another structural element.

FIG. 1 is a view showing the configuration of a driving assistance apparatus, according to an embodiment.

Referring to FIG. 1, the driving assistance apparatus 100, according to an embodiment, may include: a first detecting unit 110 for monitoring the front area of the vehicle, the left and right front areas of the vehicle, and both lateral areas of the vehicle in order to thereby detect an object by using one or more cameras and one or more radars; an estimating unit 120 for tracking one or more objects that are detected in at least one of the front area, the left and right front areas, or both of the lateral areas in order to thereby estimate the movement of the object; a selecting unit 130 for selecting a target object from the one or more objects based on the conditions containing the estimated movement; a determining unit 140 for calculating the time to collision (TTC) with the target object, and for determining the risk of collision to be one of the three separated levels based on the calculated time to collision; a first controller 150 for partially controlling a braking device of the vehicle if the risk of collision with the target object corresponds to Level 2; a second detecting unit 160 for monitoring the rear area of the vehicle in order to thereby detect a rear object if the risk of collision with the target object corresponds to Level 3, which is higher than Level 2; and a second controller 170 for controlling the braking device or a steering device based on whether or not the rear object is detected.

The camera may include: a condensing unit for receiving light; an imaging unit for forming images by means of the received light; and an adjusting device for adjusting the state. The condensing unit is a component that receives light to then form the image on the imaging unit, and there are various types of condensing units that range from a simple and small hole, such as a pinhole camera, to a complex condensing unit that uses a variety of multi-lenses. The general condensing unit of a camera includes lenses, an aperture, and a device for adjusting the distance of the lens.

In general, the condensing unit is also referred to as a photo lens. The imaging unit is a component on which an image is formed by the light through the condensing unit. In the case of a film camera, a photosensitive film is positioned on the imaging unit to then photograph an object in order to thereby make a photo by developing and printing the same. On the contrary, in the case of a digital camera, a device (CMOS, CCD, or the like) for converting optical signals into electrical signals is provided in the imaging unit so that digital images of the electrical signals in various types of image files are stored in the storage medium. The adjusting device is a component that operates in order to obtain a desired image, and may representatively include an aperture for adjusting the hole size of the condensing unit and a shutter for receiving or blocking light. For example, the amount of light may be reduced by narrowing the aperture in a bright place, and the amount of light may increase by opening the aperture in a dark place in order to thereby take an appropriate photo. In addition, a rapid movement of an athlete may be photographed as a freeze-frame by the fast operation of the shutter. Furthermore, the adjusting device may include a flash to enable the photographing in a dark place and a viewfinder to pre-view a target to be photographed.

The radar is a device for measuring the distance to a target by radiating electromagnetic waves and analysing the electromagnetic waves that are reflected by the target. Low-frequency waves having a long wavelength, which are used in the radar, can detect a faraway target with a small attenuation of waves, but cannot secure a precise measurement in order to thereby deteriorate the resolution. On the contrary, high-frequency waves having a short wavelength, which are used in the radar, may be attenuated a lot because the waves tend to be easily absorbed or reflected by water vapour contained in the air, snow, or rain so that the waves cannot detect a faraway target, but can provide a high resolution. According to this feature, when it is necessary to quickly find a distant target, such as an anti-aircraft radar or a ground radar, the low-frequency radio waves are used, whereas when it is necessary to precisely measure the shape or size of a target, such as a fire-control radar, the high-frequency radio waves are used.

The first detecting unit 110 may monitor the front area of the vehicle, the left and right front areas of the vehicle, and both lateral areas of the vehicle in order to thereby detect an object by using at least one of the cameras or the radars described above. The second detecting unit 160 may monitor the rear area of the vehicle in order to thereby detect a rear object by using one of the cameras or the radars described above.

Figure 2:
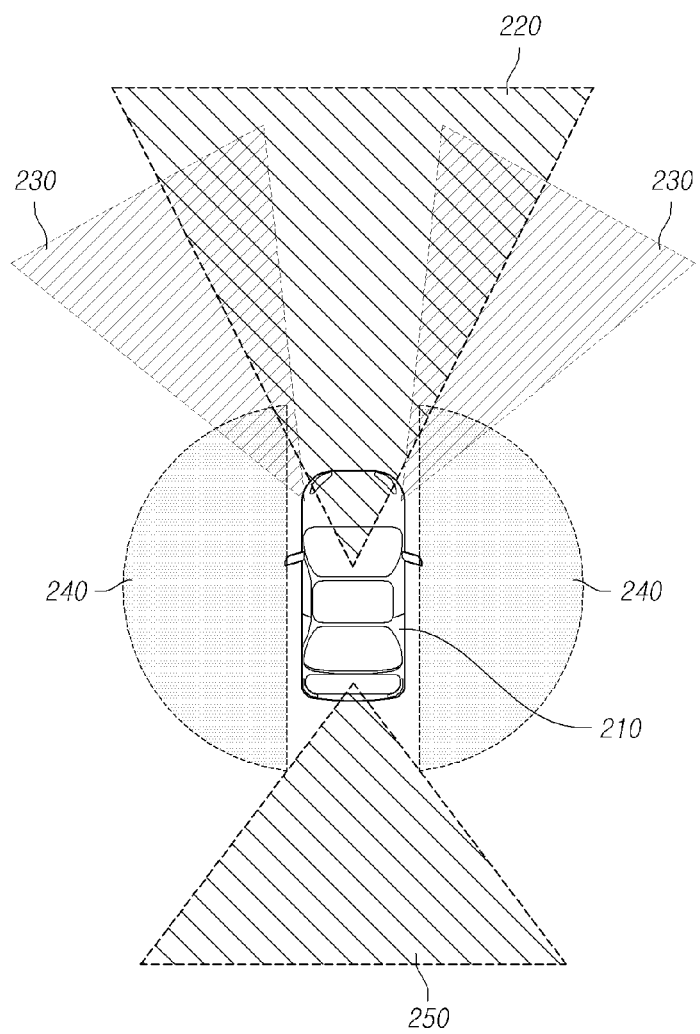
FIG. 2 is a view showing an example to explain the operation of a detecting unit of a driving assistance apparatus, according to an embodiment.

For example, the first detecting unit 110 may monitor the front area of the vehicle, the left and right front areas of the vehicle, and both lateral areas of the vehicle in order to thereby detect an object by installing the cameras and the radars as shown in FIG. 2. The second detecting unit 160 may monitor the rear area of the vehicle in order to thereby detect a rear object by installing the cameras or the radars as shown in FIG. 2.

FIG. 2 is a view showing an example to explain the operation of the detecting unit of a driving assistance apparatus, according to an embodiment.

Referring to FIG. 2, the first detecting unit may: monitor the front area 220 of the vehicle 210 by using a front camera; monitor the left and right front areas 230 of the vehicle 210 by using lateral radars; and may monitor both lateral areas 240 of the vehicle 210 by using lateral cameras. Also, the second detecting unit may monitor the rear area 250 of the vehicle 210 by using a rear camera. The lateral and rear cameras may include cameras that are used for an AVM (Around View Monitor).

The estimating unit 120 of the driving assistance apparatus 100, according to an embodiment, may estimate the movement of at least one object that is detected in at least one of the front area, the left and right front areas, or both of the lateral areas, which are monitored by the first detecting unit 110.

For example, when the first detecting unit 110 monitors the front area, the left and right front areas, and both of the lateral areas at a constant time interval and detects one or more objects, the estimating unit 120 may estimate the same object among one or more objects that are detected at a certain time (T) and among one or more objects that are detected at the time (T−dT) {i.e., a constant period of time (dT) before the time (T)}, and may estimate the position of the same object at the time (T+dT) {i.e., after a constant period of time (dT) from the time (T)} based on a positional change of the estimated same object. For example, the estimating unit 120 may estimate the position of the same object by applying a linear change in the position.

That is, the estimating unit 120 may estimate the movement of the same object that is detected by the first detecting unit 110 that monitors the areas at a constant time interval.

The selecting unit 130 of the driving assistance apparatus 100, according to an embodiment, may select, as a target object, one of the objects that are detected by the first detecting unit 110 based on the conditions that contain the movement of the object, which is estimated by the estimating unit 120.

For example, the selecting unit 130 may select a target object by applying, to each of the objects that are detected by the first detecting unit 110, the first condition in which the object is detected in the front area, the second condition in which the object is detected in a predetermined target area, the third condition in which the movement of the object estimated by the estimating unit 120 is made toward the target area, and the fourth condition in which the object is detected in a nearby position.

As a detailed example, the selecting unit 130 may select the second object or the third object as the target object if the first detecting unit 110 detects: the first object that corresponds to the first condition in which the object is detected in the front area; the second object that corresponds to the first condition in which the object is detected in the front area, and that corresponds to the second condition in which the object is detected in a predetermined target area; and the third object that corresponds to the first condition in which the object is detected in the front area, and that corresponds to the third condition in which the estimated movement of the object is made toward the target area. In addition, the selecting unit 130 may apply, to the second object and the third object, the fourth condition in which the object is detected in a nearby position in order to thereby select one of the second object or the third object as the target object. That is, the selecting unit 130 may apply the first condition, the second condition, and the third condition in order to thereby select the target object, and if two or more objects satisfy the first condition, the second condition, and the third condition, the selecting unit 130 may further reflect the fourth condition in order to thereby select a single target object.

The determining unit 140 may calculate the time to collision (TTC) with the target object that is selected by the selecting unit 130, and may determine the risk of collision of the vehicle to be one of three classified levels based on the calculated time to collision. Level 1, which is the lowest level of the three levels, means that there is no risk of collision, and Level 2, which is an intermediate level of the three levels, means that there is a risk of collision but the collision may be avoidable by a partial control of the braking device. Level 3, which is the highest level of the three levels, requires a full braking to completely control the braking device, wherein the collision may be avoidable by the full braking or may not be avoidable even by the full braking.

If the determining unit 140 determines the risk of collision to be Level 2, the first controller 150 may partially control the braking device included in the vehicle in order to thereby avoid the collision. The partial control of the braking device may refer to an operation of decelerating the vehicle by partially increasing the brake pressure while allowing passengers, as well as a driver, to feel comfortable.

In contrast, if the determining unit 140 determines the risk of collision to be Level 3, which is higher than Level 2, the second detecting unit 160 monitors the rear area of the vehicle in order to thereby detect a rear object.

Afterwards, the second controller 170 may control the braking device or steering device included in the vehicle according to the detection result of the rear object by the second detecting unit 160.

As the first example, when no rear object is detected by the second detecting unit 160, the second controller 170 may completely control the braking device. The complete control of the braking device may refer to the control of rapidly decelerating the vehicle by increasing the brake pressure to the maximum value. Thus, the vehicle may avoid a collision with the preceding vehicle.

As the second example, when a rear object is detected by the second detecting unit 160, the second controller 170 may determine the risk of collision with the detected rear object. If it is determined that there is no risk of collision with the rear object, the second controller 170 may completely control the braking device. Thus, the vehicle may avoid a collision with the preceding vehicle and with the rear vehicle.

As the third example, when a rear object is detected by the second detecting unit 160, the second controller 170 may determine the risk of collision with the detected rear object. If it is determined that there is a risk of collision with the rear object, and if another object is detected in the left and right front areas by the first detecting unit 110, the second controller 170 may completely control the braking device included in the vehicle. According to this, the vehicle may be hit by a rear vehicle.

As the fourth example, when a rear object is detected by the second detecting unit 160, the second controller 170 may determine the risk of collision with the detected rear object. If it is determined that there is a risk of collision with the rear object, but if no object is detected in the left and right front areas by the first detecting unit 110, the second controller 170 may control the steering device included in the vehicle. According to this, the vehicle may change the lane in order to thereby avoid a collision with a rear vehicle.

As the fifth example, when a rear object is detected by the second detecting unit 160, the second controller 170 may make a further control to operate an air bag that is installed in the back seat. The operation of the air bag installed in the back seat may be intended to let the rear vehicle easily recognize the risk of the vehicle. To this end, the operated air bag may be designed to: have a striking color (for example, a color that is distinct from the color of the vehicle and from the colors of the surroundings); be recognized through the rear windshield; or come out, in part, through the window, and may be provided in the vehicle.

As the sixth example, when a rear object is detected by the second detecting unit 160, the second controller 170 may make a further control to open the trunk. The operation of opening the trunk may be intended to let the rear vehicle easily recognize the risk of the vehicle. To this end, the open trunk may be designed to have a striking color (for example, a color that is distinct from the color of the vehicle and from the colors of the surroundings), or may be designed to operate a notification device (for example, a light-emitting signal stick or a warning triangle) that is provided therein.

As the seventh example, when a rear object is detected by the second detecting unit 160, the second controller 170 may make a further control to operate taillights. The operation of the taillights may be intended to let the rear vehicle easily recognize the risk of the vehicle. To this end, the taillights may be operated in a special manner. The special operation, for example, may include an operation in which the taillights rapidly blink, or in which the left and right taillights alternately blink.

As the eighth example, when a rear object is detected by the second detecting unit 160, the second controller 170 may make a further control to provide a risk of collision with the vehicle to the rear object by using communication. The communication may refer to communications including V2V (Vehicle-To-Vehicle) communication.

As the ninth example, if a rear object is detected by the second detecting unit 160, and if the distance between the stopped vehicle and the target object, which is detected by the first detecting unit 110, exceeds a predetermined safety distance, the second controller 170 may further control the stopped vehicle to move forward. To this end, the first detecting unit 110 may further detect whether or not the vehicle is stopped.

More specifically in relation to the ninth embodiment, the distance between the vehicle that has been stopped by the control of the braking device and the target object may exceed a necessary value (the safety distance). In this case, the second controller 170 may control the vehicle to move forward in order to thereby increase the distance between the vehicle and the rear object so that the risk of collision between the vehicle and the rear object may be reduced.

As described above, according to the driving assistance apparatus of an embodiment, the vehicle may be preferably controlled in real time by monitoring the front area, the left and right front areas, both of the lateral areas, and the rear area of the vehicle. The preferable control may mean a control to: avoid a collision; prevent a secondary collision; or minimize the damage of collision.

Figure 3:
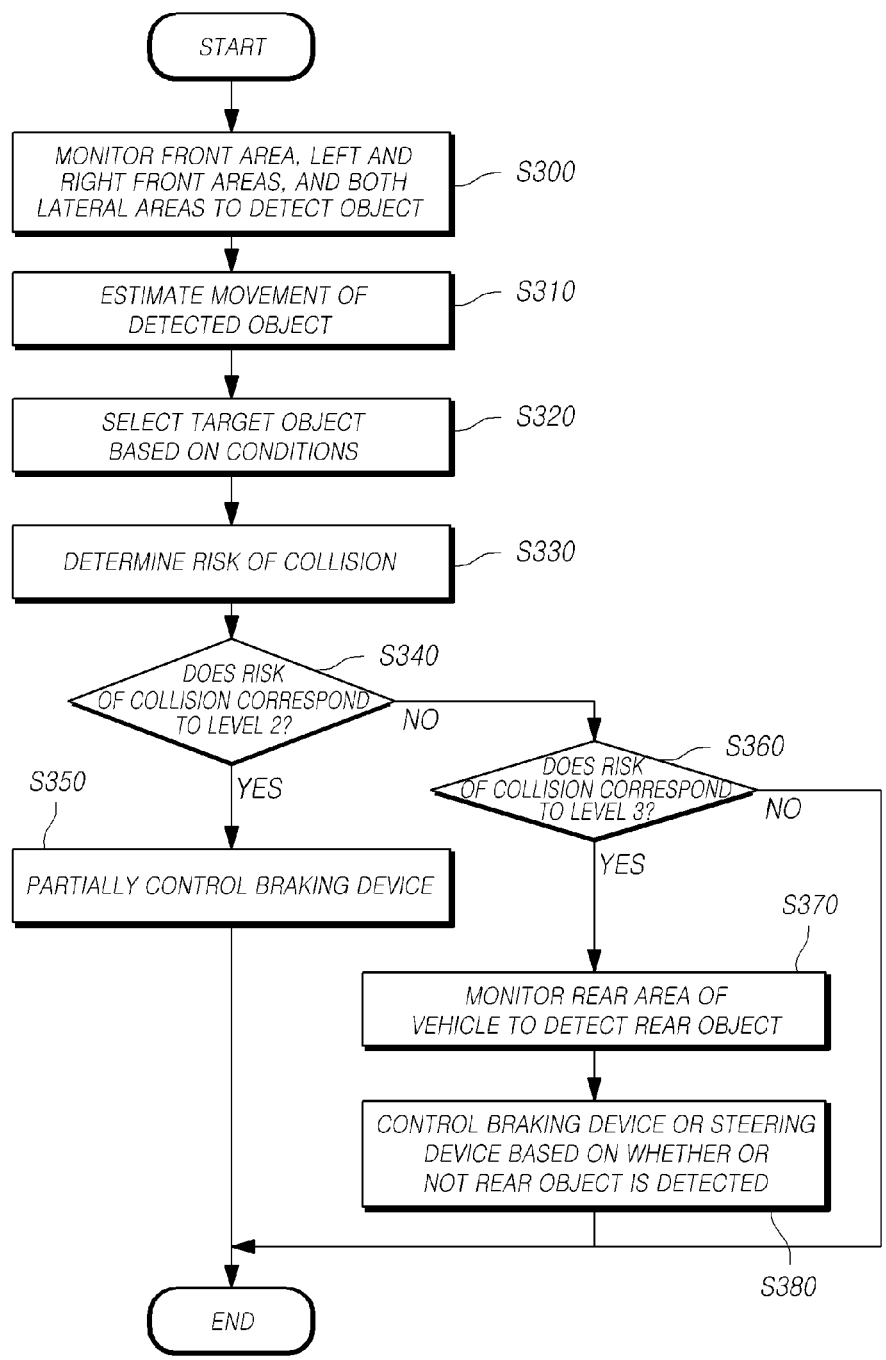
FIG. 3 is a view showing an example to explain the operation of a driving assistance apparatus, according to an embodiment.

FIG. 3 is a view showing an example to explain the operation of a driving assistance apparatus, according to an embodiment.

Referring to FIG. 3, the first detecting unit of the driving assistance apparatus, according to an embodiment, monitors the front area of the vehicle, the left and right front areas of the vehicle, and both lateral areas of the vehicle in order to thereby detect an object by using one or more cameras and one or more radars (S300), and the estimating unit estimates the movement of at least one object that is detected in operation S300 (S310).

Operations S300 to S310 will be described in detail with reference to FIGS. 4A, 4B, and 4C.

Figure 4A:
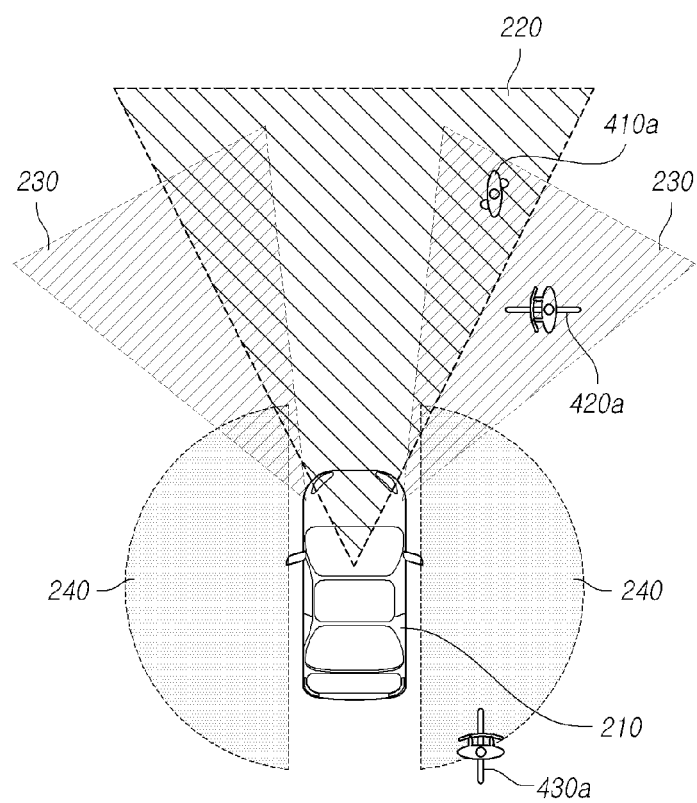
FIG. 4A is a view showing the first example to explain the operation of a first detecting unit and an estimating unit, according to an embodiment.
Figure 4B:
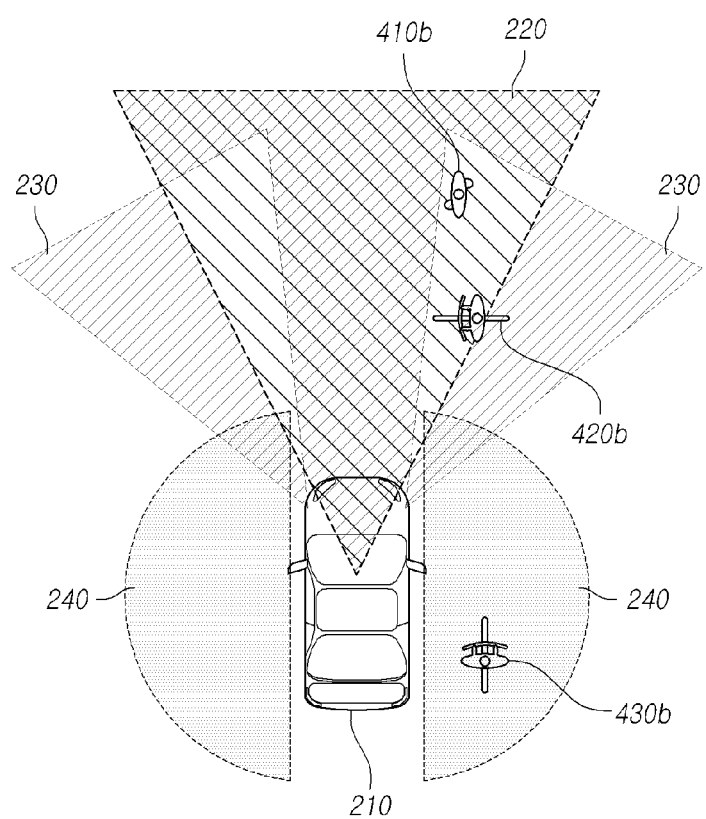
FIG. 4B is a view showing the second example to explain the operation of a first detecting unit and an estimating unit, according to an embodiment.

FIG. 4A is a view showing the first example to explain the operation of the first detecting unit and the estimating unit, according to an embodiment, and FIG. 4B is a view showing the second example to explain the operation of the first detecting unit and the estimating unit, according to an embodiment. FIG. 4C is a view showing the third example to explain the operation of the first detecting unit and the estimating unit, according to an embodiment.

Figure 4C:
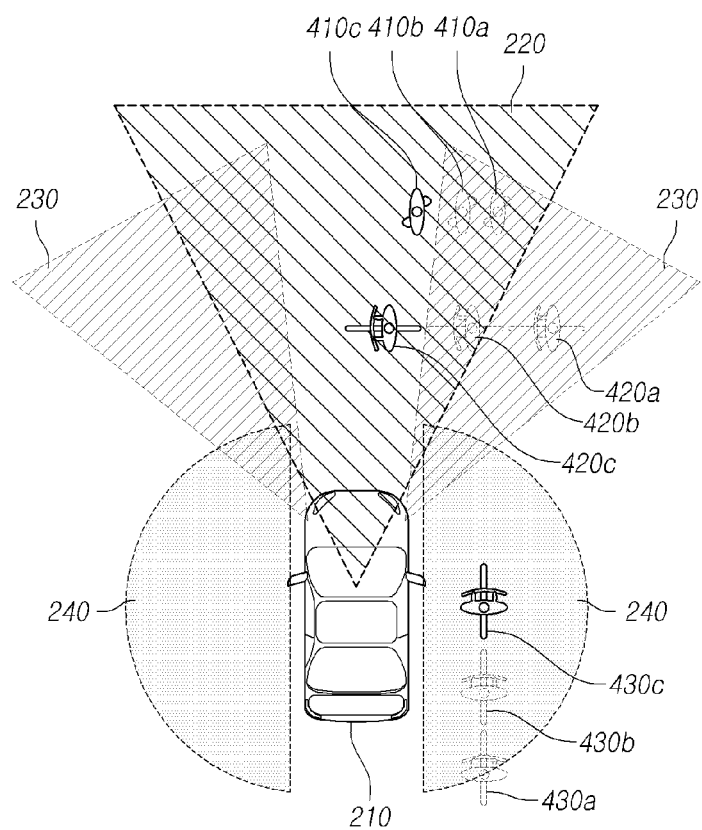
FIG. 4C is a view showing the third example to explain the operation of a first detecting unit and an estimating unit, according to an embodiment.

FIG. 4A and FIG. 4B and FIG. 4C show a pedestrian 410a, 410b, 410c and cyclists 420a, 420b, 420c and 430a, 430b, 430c who are detected by the first detecting unit that monitors the front area 220 of the vehicle 210, the left and right front areas 230 of the vehicle 210, and both lateral areas 240 of the vehicle 210, according to an embodiment. Here, FIG. 4A shows a situation at the time (T−dT) {i.e., a constant period of time (dT) before the time (T)}, and FIG. 4B shows a situation at the time (T). FIG. 4C shows a situation of the pedestrian 410C and the cyclists 420C and 430C, which is estimated by the estimating unit at the time (T+dT) {i.e., after a constant period of time (dT) from the time (T)} based on the situations detected in FIGS. 4A and 4B.

Referring to FIG. 4A, the first detecting unit may monitor the front area 220 of the vehicle 210, the left and right front areas 230 of the vehicle 210, and both lateral areas 240 of the vehicle 210 at the time (T−dT) {i.e., a constant period of time (dT) before the time (T)} in order to thereby detect the pedestrian 410a and the cyclists 420a and 430a. Referring to FIG. 4B, the first detecting unit may monitor the front area 220 of the vehicle 210, the left and right front areas 230 of the vehicle 210, and both lateral areas 240 of the vehicle 210 at the time (T) {i.e., after a constant period of time (dT) from the time of FIG. 4A} in order to thereby detect the pedestrian 410b and the cyclists 420b and 430b.

Referring to FIG. 4C, the estimating unit may estimate the pedestrian 410c and the cyclists 420c and 430c at the time (T+dT) {i.e., after a constant period of time (dT) from the time (T)} based on a positional change of the pedestrian 410a and the cyclists 420a and 430a who are detected in FIG. 4A, and the pedestrian 410b and the cyclists 420b and 430b who are detected in FIG. 4B. To this end, the first detecting unit is to distinguish the objects from each other, which are detected at a constant time interval, and is to recognize the same object even after the lapse of a constant time.

As described above, when the first detecting unit monitors the front area of the vehicle, the left and right front areas of the vehicle, and both lateral areas of the vehicle in order to thereby detect the object, and when the estimating unit estimates the movement of the object, the selecting unit selects, as a target object, one of detected objects based on the conditions containing the movement of the object, which is estimated in S310 (S320).

The conditions, for example, may contain: the first condition in which the object is detected in the front area of the vehicle; the second condition in which the object is detected in a predetermined target area; the third condition in which the estimated movement of the object is made toward the target area; and the fourth condition in which the object is detected in a nearby position.

Referring to FIG. 4C, the selecting unit may apply the first condition, the second condition, the third condition, and the fourth condition to each of the pedestrian 410 and the cyclists 420 and 430 in order to thereby obtain Table 1 as follows.

TABLE 1

|  | First condition | Second condition | Third condition | Fourth condition |
|---|---|---|---|---|
| Pedestrian (410) | Satisfied | Not satisfied | Satisfied | positioned far away |
| First cyclist (420) | Satisfied | Not satisfied | Satisfied | positioned halfway |
| Second cyclist (430) | Not satisfied | Not satisfied | Not satisfied | Positioned nearby |

In Table 1, although the target area is illustrated to be the area 220 that is monitored by the front camera, except for the areas 230 that are monitored by the lateral radars, the target area may be configured to be different depending on the experiment. The fourth condition may mean a relative position.

Referring to Table 1, the selecting unit may select, as the target object, the first cyclist 420 according to the fourth condition among the pedestrian 410 corresponding to the first condition and the third condition and the first cyclist 420 corresponding to the first condition and the third condition.

Next, the determining unit calculates the time to collision (TTC) with the selected target object, and determines a risk of collision based on the time to collision (S330).

For example, based on the calculated time to collision, the determining unit may determine the risk of collision to be one of: Level 1 in which there is no risk of collision; Level 2 in which the collision may be avoidable by a partial control of the braking device; or Level 3 in which the collision may be avoidable by a full braking or may not be avoidable even by the full braking. The time to collision of Level 3 may be configured to be 1 second or less, and the time to collision of Level 2 may be configured to be 1 second to 2 seconds, which may vary depending on the experiment.

Afterwards, the first controller determines whether or not the risk of collision determined in operation S330 corresponds to Level 2 (S340).

If it is determined that the risk of collision corresponds to Level 2 in operation S340 (YES), the first controller partially controls the braking device of the vehicle (S350). The partial control of the braking device may mean an operation of decelerating the vehicle by partially increasing the brake pressure while allowing passengers, as well as a driver, to feel comfortable.

On the contrary, if it is determined that the risk of collision does not correspond to Level 2 (NO), the second detecting unit determines whether or not the risk of collision determined in operation S330 corresponds to Level 3 (S360).

If it is determined that the risk of collision corresponds to Level 3 in operation S360 (YES), the second detecting unit monitors the rear area of the vehicle in order to thereby detect a rear object (S370), and based on whether or not the rear object is detected in operation S370, the second controller controls the braking device or the steering device (S380).

Operation S380 will be described in more detail with reference to FIG. 5.

Figure 5:
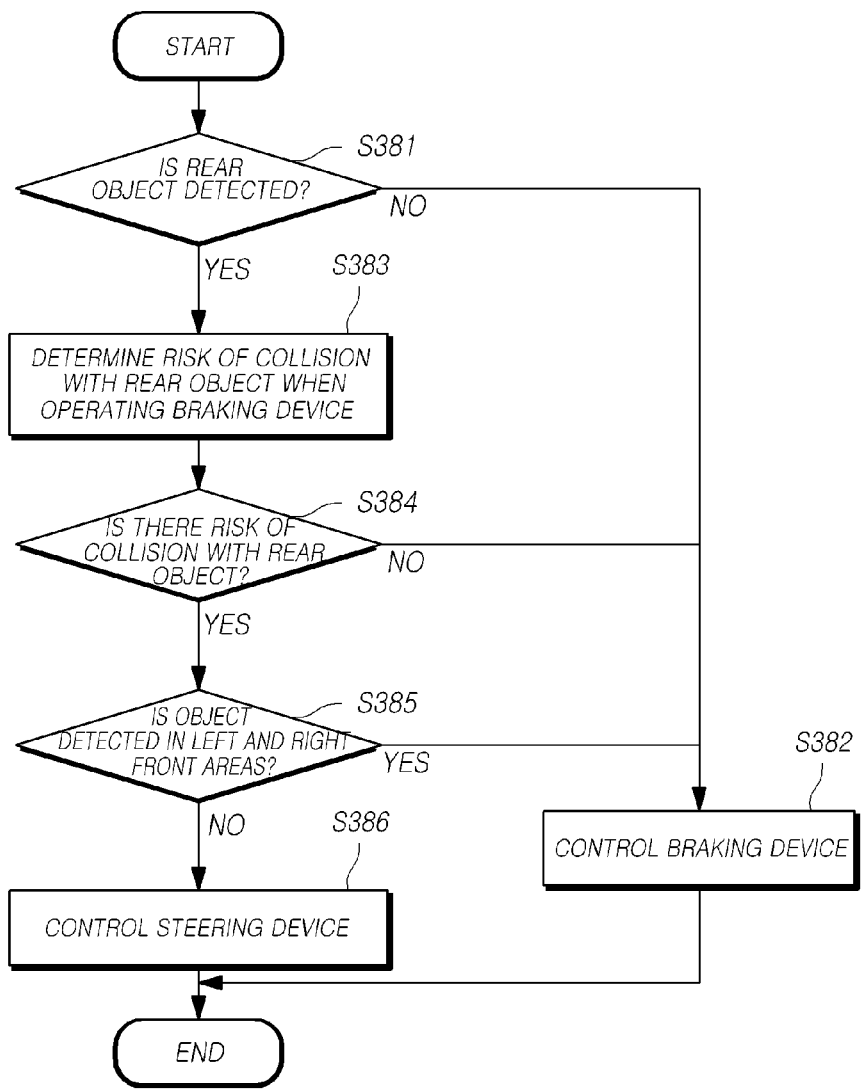
FIG. 5 is a view showing an example to explain the operation of a second controller, according to an embodiment.

FIG. 5 is a view showing an example to explain the operation of the second controller, according to an embodiment.

Referring to FIG. 5, the second controller determines whether or not a rear object is detected by the second detecting unit (S381).

If it is determined that no rear object is detected in operation S381 (NO), the second controller completely controls the braking device (S382). The complete control may refer to a full braking. Accordingly, the vehicle fully brakes in order to thereby avoid a collision with a preceding vehicle.

If it is determined that a rear object is detected in operation S381 (YES), the second controller determines a risk of collision with the detected rear object when the braking device is completely controlled (S383).

For example, the second detecting unit that detects a rear object at a constant time interval (dT) may estimate the movement of the rear object based on the distance to the rear object at the time (T−dT) {i.e., a constant period of time (dT) before the time (T)} and the distance to the rear object at the time (T), and may determine a risk of collision with the rear object based on the estimated movement. This operation may be similar to the operation of estimating the movement of the object in FIGS. 4A to 4C.

Afterwards, the second controller determines whether or not there is a risk of collision as a result of the determination in operation 383 (S384).

If it is determined that there is no risk of collision with the rear object in operation 384 (NO), the second controller completely controls the braking device (S382). Accordingly, the vehicle fully brakes to not collide with a rear vehicle, as well as with a preceding vehicle.

In contrast, if it is determined that there is a risk of collision with the rear object in operation 384 (YES), the second controller determines whether or not an object is detected in the left and right front areas by the first detecting unit (S385).

If an object is detected in the left and right front areas in operation S385 (YES), the second controller completely controls the braking device (S382). Accordingly, the vehicle fully brakes in order to thereby avoid a collision with a preceding vehicle, but a collision with a rear vehicle may occur.

On the contrary, if no object is detected in the left and right front areas in operation S385 (NO), the second controller controls the steering device (S386). According to this, the vehicle may move to one of the left or right front area in order to thereby avoid a collision with a preceding vehicle and with a rear vehicle.

Furthermore, if it is determined that a rear object is detected in operation S381 (YES), the second controller may make a further control to: operate an air bag that is installed in the back seat; open the trunk; operate taillights; or provide information about a risk of collision with the vehicle to the rear object by using communication. Hereinafter, a driving assistance method executed by the driving assistance device described in FIGS. 1 to 5 will be briefly described.

Figure 6A:
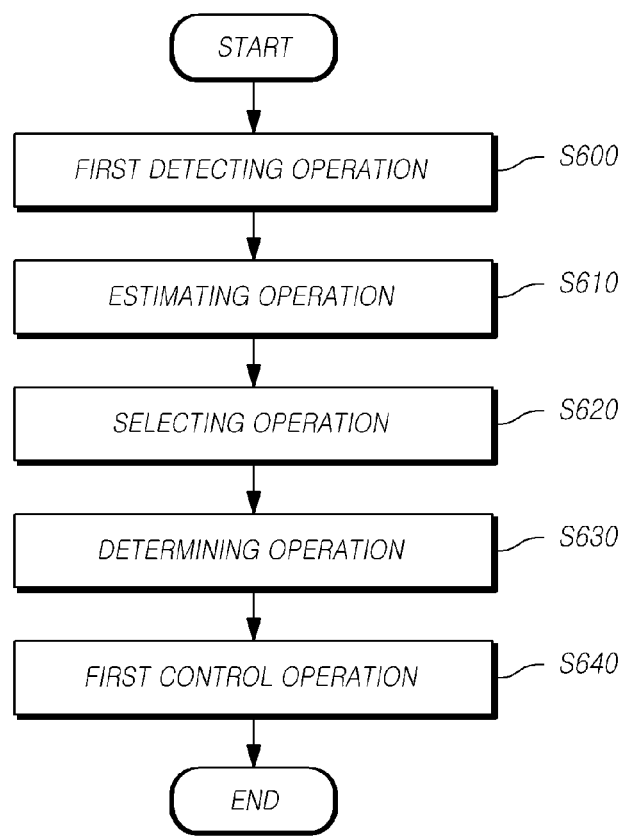
FIG. 6A is the first flowchart of a driving assistance method, according to an embodiment.
Figure 6B:
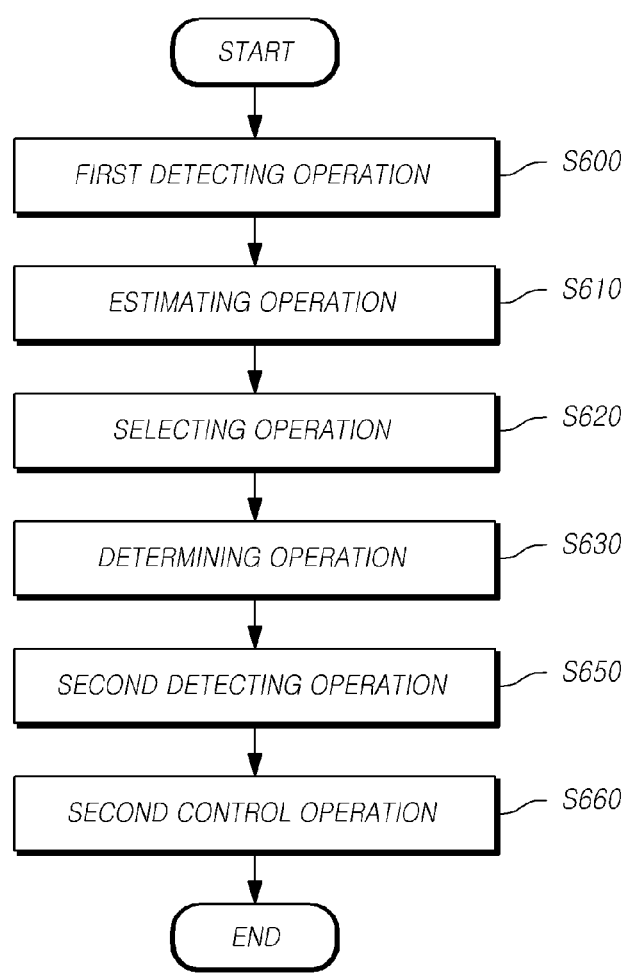
FIG. 6B is the second flowchart of a driving assistance method, according to an embodiment.

FIG. 6A is the first flowchart of a driving assistance method, according to an embodiment, and FIG. 6B is the second flowchart of a driving assistance method, according to an embodiment.

Referring to FIGS. 6A and 6B, the driving assistance method, according to an embodiment, may include: a first detecting operation S600 of monitoring the front area of the vehicle, the left and right front areas of the vehicle, and both lateral areas of the vehicle in order to thereby detect an object by using one or more cameras and one or more radars; an estimating operation S610 of tracking one or more objects that are detected in at least one of the front area, the left and right front areas, or both of the lateral areas in order to thereby estimate the movement of the object; a selecting operation S620 of selecting, as a target object, one of the objects based on the conditions containing the estimated movement; a determining operation S630 of calculating the time to collision (TTC) with the target object, and of determining a risk of collision to be one of three levels; a first control operation S640 of partially controlling a braking device of the vehicle if the risk of collision with the target object corresponds to Level 2; a second detecting operation S650 of monitoring the rear area of the vehicle in order to thereby detect a rear object if the risk of collision with the target object corresponds to Level 3 in which the risk of collision is higher; and a second control operation S660 of controlling the braking device or a steering device based on whether or not the rear object is detected.

The camera may include: a condensing unit for receiving light; an imaging unit for forming images by means of the received light; and an adjusting device for adjusting the state. The condensing unit is a component that receives light to then form the image on the imaging unit, and there are various types of condensing units that range from a simple and small hole, such as a pinhole camera, to a complex condensing unit that uses a variety of multi-lenses. The general condensing unit of a camera includes lenses, an aperture, and a device for adjusting the distance of the lens. In general, the condensing unit is also referred to as a photo lens. The imaging unit is a component on which an image is formed by the light through the condensing unit. In the case of a film camera, a photosensitive film is positioned on the imaging unit to then photograph an object in order to thereby make a photo by developing and printing the same. On the contrary, in the case of a digital camera, a device (CMOS, CCD, or the like) for converting optical signals into electrical signals is provided in the imaging unit so that digital images of the electrical signals in various types of image files are stored in the storage medium. The adjusting device is a component that operates in order to obtain a desired image, and may representatively include an aperture for adjusting the hole size of the condensing unit and a shutter for receiving or blocking light. For example, the amount of light may be reduced by narrowing the aperture in a bright place, and the amount of light may increase by opening the aperture in a dark place in order to thereby take an appropriate photo. In addition, a rapid movement of an athlete may be photographed as a freeze-frame by the fast operation of the shutter. Furthermore, the adjusting device may include a flash to enable the photographing in a dark place and a viewfinder to pre-view a target to be photographed.

The radar is a device for measuring the distance to a target by radiating electromagnetic waves and analysing the electromagnetic waves that are reflected by the target. Low-frequency waves having a long wavelength, which are used in the radar, can detect a faraway target with a small attenuation of waves, but cannot secure a precise measurement in order to thereby deteriorate the resolution. On the contrary, high-frequency waves having a short wavelength, which are used in the radar, are attenuated a lot because the waves tend to be easily absorbed or reflected by water vapour contained in the air, snow, or rain so that the waves cannot detect a faraway target, but can obtain a high resolution. According to this feature, when it is necessary to quickly find a distant target, such as an anti-aircraft radar or a ground radar, the low-frequency radio waves are used, whereas when it is necessary to precisely measure the shape or size of a target, such as a fire-control radar, the high-frequency radio waves are used.

In the first detecting operation S600, an object may be detected by monitoring the front area of the vehicle, the left and right front areas of the vehicle, and both lateral areas of the vehicle by using one or more cameras and one or more radars described above, and in the second detecting operation S650, a rear object may be detected by monitoring the rear area of the vehicle by using one of the cameras or the radars.

For example, the front area of the vehicle, the left and right front areas of the vehicle, and both lateral areas of the vehicle may be monitored by installing the cameras and the radars as shown in FIG. 2 in order to thereby detect an object in the first detecting operation S600, and the rear area of the vehicle may be monitored by installing the cameras and the radars as shown in FIG. 2 in order to thereby detect a rear object in the second detecting operation S650.

In the estimating operation S610 of the driving assistance method, according to an embodiment, the movement of at least one object may be estimated, which is detected in at least one of the front area, the left and right front areas, and both lateral areas in the first detecting operation S600.

For example, when one or more objects are detected by monitoring the front area, the left and right front areas, and both lateral areas at a constant time interval in the first detecting operation S600, the same object may be estimated among one or more objects that are detected at a certain time (T) and among one or more objects that are detected at the time (T−dT) {i.e., a constant period of time (dT) before the time (T)} in the estimating operation S610 in order to thereby estimate the position of the same object at the time (T+dT) {i.e., after a constant period of time (dT) from the time (T)} based on a positional change of the estimated same object. For example, the position of the same object may be estimated by applying a linear change in the position in the estimating operation S610.

That is, in the estimating operation S610, the movement of the same object may be estimated, which has been detected in the first detecting operation S600 in which the areas are monitored at a constant time interval.

In the selecting operation S620 of the driving assistance method, according to an embodiment, a target object may be selected from one or more objects that have been detected in the first detecting operation S600 based on the conditions containing the movement of the object, which has been estimated in the estimating operation S610.

For example, in the selecting operation S620, the target object may be selected by applying, to each of the objects that have been detected in the first detecting operation S600, the first condition in which the object is detected in the front area, the second condition in which the object is detected in a predetermined target area, the third condition in which the movement of the object estimated in the estimating operation S610 is made toward the target area, and the fourth condition in which the object is detected in a nearby position.

As a detailed example, if the first object that corresponds to the first condition in which the object is detected in the front area, the second object that corresponds to the first condition in which the object is detected in the front area and that corresponds to the second condition in which the object is detected in a predetermined target area, and the third object that corresponds to the first condition in which the object is detected in the front area and that corresponds to the third condition in which the estimated movement is made toward the target area are detected in the first detecting operation S600, the second object or the third object may be selected as a target object in the selecting operation S620. In addition, in the selecting operation S620, one of the second object or the third object may be as a target object by applying, to the second object and the third object, the fourth condition in which the object is detected in a nearby position. That is, the first condition, the second condition, and the third condition may be applied in order to select the target object, and if two or more objects satisfy the first condition, the second condition, and the third condition, one target object may be selected by further applying the fourth condition.

In the determining operation S630, the time to collision (TTC) with the target object that has been selected in the selecting operation S620 may be calculated and a risk of collision with the vehicle may be determined to be one of three levels based on the calculated time to collision. Level 1, which is the lowest level of the three levels, means that there is no risk of collision, and Level 2, which is an intermediate level of the three levels, means that there is a risk of collision but the collision may be avoidable by a partial control of the braking device. Level 3, which is the highest level of the three levels, requires a full braking to completely control the braking device, wherein the collision may be avoidable by the full braking or may not be avoidable even by the full braking.

If the risk of collision is determined to be Level 2 in the determining operation S630, the braking device included in the vehicle may be partially controlled in order to thereby avoid the collision in the first control operation S640. The partial control of the braking device may mean an operation of decelerating the vehicle by partially increasing the brake pressure while allowing passengers, as well as a driver, to feel comfortable.

In contrast, if the risk of collision is determined to be Level 3, which is higher, in the determining operation S630, the rear area of the vehicle is monitored in order to thereby detect a rear object in the second detecting operation S650.

Afterwards, in the second control operation S660, the braking device or steering device included in the vehicle may be controlled according to the detection result of the rear object in the second detecting operation S650.

As the first example, when no rear object is detected in the second detecting operation S650, the braking device may be completely controlled in the second control operation S660. The complete control of the braking device may refer to the control of suddenly decelerating the vehicle by increasing the brake pressure to the maximum value. Thus, the vehicle may avoid a collision with a preceding vehicle.

As the second example, when a rear object is detected in the second detecting operation S650, the risk of collision with the detected rear object may be determined in the second control operation S660. If it is determined that there is no risk of collision with the rear object, the braking device included in the vehicle may be completely controlled. Thus, the vehicle may avoid a collision with a preceding vehicle and with a rear vehicle.

As the third example, when a rear object is detected in the second detecting operation S650, the risk of collision with the detected rear object may be determined in the second control operation S660. If it is determined that there is a risk of collision with the rear object, and if another object is detected in the left and right front areas in the first detecting operation S600, the braking device included in the vehicle may be completely controlled. According to this, the vehicle may be hit by a rear vehicle.

As the fourth example, when a rear object is detected in the second detecting operation S650, the risk of collision with the detected rear object may be determined in the second control operation S660. If it is determined that there is a risk of collision with the rear object, but if no object is detected in the left and right front areas in the first detecting operation S600, the steering device included in the vehicle may be controlled. According to this, the vehicle may change the lane in order to thereby avoid a collision with a rear vehicle.

As the fifth example, when a rear object is detected in the second detecting operation S650, a further control may be made to operate an air bag that is installed in the back seat in the second control operation S660. The operation of the air bag installed in the back seat may be intended to let the rear vehicle easily recognize the risk of the vehicle. To this end, the operated air bag may be designed to: have a striking color (for example, a color that is distinct from the color of the vehicle and from the colors of the surroundings); be recognized through the rear windshield; or come out, in part, through the window, and may be provided in the vehicle.

As the sixth example, when a rear object is detected in the second detecting operation S650, a further control may be made to open the trunk in the second control operation S660. The operation of opening the trunk may be intended to let the rear vehicle easily recognize the risk of the vehicle. To this end, the open trunk may be designed to have a striking color (for example, a color that is distinct from the color of the vehicle and from the colors of the surroundings), or may be designed to operate a notification device (for example, a light-emitting signal stick or a warning triangle) that is provided therein.

As the seventh example, when a rear object is detected in the second detecting operation S650, a further control may be made to operate taillights in the second control operation S660. The operation of the taillights may be intended to let the rear vehicle easily recognize the risk of the vehicle. To this end, the taillights may be operated in a special manner. The special operation, for example, may include an operation in which the taillights rapidly blink, or in which the left and right taillights alternately blink.

As the eighth example, when a rear object is detected in the second detecting operation S650, a further control may be made to provide a risk of collision with the vehicle to the rear object by using communication in the second control operation S660. The communication may refer to communications including V2V (Vehicle-To-Vehicle) communication.

As the ninth example, if a rear object is detected in the second detecting operation S650, and if the distance between the stopped vehicle and the target object, which is detected in the first detecting operation S600, exceeds a predetermined safety distance, the stopped vehicle may be further controlled to move forward in the second control operation S660. To this end, it may be further detected whether or not the vehicle is stopped in the first detecting operation S600.

More specifically in relation to the ninth embodiment, the distance between the vehicle that is stopped by the control of the braking device and the target object may exceed a necessary value (the safety distance). In this case, the vehicle is controlled to further move forward in order to thereby increase the distance between the vehicle and the rear object so that the risk of collision between the vehicle and the rear object may be reduced in the second control operation S650.

As described above, according to the driving assistance method of the present embodiment, the vehicle may be preferably controlled in real time by monitoring the front area, the left and right front areas, both of the lateral areas, and the rear area of the vehicle. The preferable control may mean a control to: avoid a collision; prevent a secondary collision; or minimize the damage of collision.

In addition, the driving assistance method of the present embodiment may perform all operations executed by the driving assistance apparatus of the present embodiment, which have been described with reference to FIGS. 1 to 5.

The above description and the accompanying drawings provide examples of the technical idea for illustrative purposes only, and those having ordinary knowledge in the technical field, to which the present embodiments pertains, will appreciate that various modifications and changes such as combinations, separations, substitutions, and changes of configurations are possible without departing from the essential features. Accordingly, the embodiments disclosed herein are not intended to limit, but are intended to describe the technical idea, and the scope of the technical idea is not limited by these embodiments. The scope of the present invention shall be construed on the basis of the accompanying claims in such a manner that all of the technical ideas included within the scope equivalent to the claims belong to the present invention.

What is claimed is:

1. A driving assistance apparatus comprising:
    a first detecting unit configured to monitor the front area of the vehicle, the left and right front areas of the vehicle, and both lateral areas of the vehicle in order to thereby detect an object by using one or more cameras and one or more radars;
    an estimating unit configured to track one or more objects that are detected in at least one of the front area, the left and right front areas, or both of the lateral areas in order to thereby estimate a movement of each of the tracked objects;
    a selecting unit configured to select a target object from the one or more objects based on conditions for estimating the movement of each of the tracked objects; and
    a determining unit configured to
        calculate the time to collision (TTC) with the target object, and
        determine whether or not a risk of collision with a rear object is occurred based on the conditions and the calculated time to collision such that the vehicle is controlled considering the rear object, wherein the risk of collision is determined to be one of three separated levels based on the calculated time to collision;
    wherein the driving assistance apparatus controls either or both of a braking device and a steering device of the vehicle based on the determination that the risk of collision with a rear object is occurred by further comprising:
    a first controller configured to partially control the braking device of the vehicle when the risk of collision with the target object corresponds to Level 2;
    a second detecting unit configured to monitor the rear of the vehicle in order to thereby detect the rear object when the risk of collision with the target object corresponds to Level 3, which is higher in risk than Level 2; and
    a second controller configured to control the braking device or the steering device based on whether or not the rear object is detected.

2. The apparatus according to claim 1, wherein the selecting unit selects the target object by applying, to each of the one or more objects, a first condition in which the object is detected in the front area, a second condition in which the object is detected in a predetermined target area, a third condition in which the movement is made toward the target area, and a fourth condition in which the object is detected in a nearby position.

3. The apparatus according to claim 1, wherein the second controller controls the braking device if no rear object is detected.

4. The apparatus according to claim 1, wherein when the rear object is detected, the second controller determines the risk of collision with the rear object when operating the braking device, and when it is determined that there is no risk of collision, the second controller controls the braking device.

5. The apparatus according to claim 1, wherein when the rear object is detected, the second controller determines the risk of collision with the rear object when operating the braking device, and when it is determined that there is the risk of collision with the rear object, and when an object is detected in the left and right front areas, the second controller controls the braking device.

6. The apparatus according to claim 1, wherein when the rear object is detected, the second controller determines the risk of collision with the rear object when operating the braking device, and when it is determined that there is the risk of collision with the rear object, but when no object is detected in the left and right front areas, the second controller controls the steering device.

7. The apparatus according to claim 1, wherein when the rear object is detected, the second controller makes a further control to operate an air bag that is installed in the back seat.

8. The apparatus according to claim 7, wherein the operated air bag is recognized through a rear windshield from the rear.

9. The apparatus according to claim 7, wherein the operated air bag comes out, in part, through a window.

10. The apparatus according to claim 1, wherein when the rear object is detected, the second controller makes a further control to open a trunk.

11. The apparatus according to claim 10, wherein the trunk comprises a notification device corresponding to a light-emitting signal stick or a warning triangle, and the notification device is operated when the trunk is opened by the second controller.

12. The apparatus according to claim 1, wherein when the rear object is detected, the second controller makes a further control to operate taillights.

13. The apparatus according to claim 12, wherein the left and right taillights are alternately operated.

14. The apparatus according to claim 1, wherein when the rear object is detected, the second controller makes a further control to provide information on a risk of collision with the vehicle to the rear object by using communication.

15. The apparatus according to claim 1, wherein when the rear object is detected, and when the distance between the stopped vehicle and the target object exceeds a predetermined safety distance, the second controller further controls the stopped vehicle to move forward.

16. A driving assistance method comprising:
    a first detecting operation of monitoring the front area of the vehicle, the left and right front areas of the vehicle, and both lateral areas of the vehicle in order to thereby detect an object by using one or more cameras and one or more radars;
    an estimating operation of tracking one or more objects that are detected in at least one of the front area, the left and right front areas, or both of the lateral areas in order to thereby estimate a movement of each of the tracked objects;

a selecting operation of selecting a target object from the one or more objects based on conditions for estimating the movement of each of the tracked objects; and a determining operation of calculating the time to collision (TTC) with the target object and determining whether or not a risk of collision with a rear object is occurred based on the conditions and the calculated time to collision such that the vehicle is controlled considering the rear object, wherein the risk of collision is determined to be one of three separated levels based on the time to collision;

wherein the driving assistance method controls either or both of a braking device and a steering device of the vehicle based on the determination that the risk of collision with a rear object is occurred by further comprising:

a first control operation of partially controlling the braking device of the vehicle when the risk of collision with the target object corresponds to Level 2;

a second detecting operation of monitoring the rear area of the vehicle in order to thereby detect the rear object when the risk of collision with the target object corresponds to Level 3 in which the risk of collision with the target object is higher in risk than that of Level 2; and a second control operation of controlling the braking device or the steering device based on whether or not the rear object is detected.

17. The method according to claim 16, wherein the second control operation comprises:

determining the risk of collision with the rear object while operating the braking device if a rear object is detected; and controlling the braking device when it is determined that there is no risk of collision.

18. The method according to claim 16, wherein the second control operation comprises:

determining the risk of collision with the rear object while operating the braking device when the rear object is detected; and controlling the braking device when it is determined that there is the risk of collision and when an object is detected in the left and right front areas.

19. The method according to claim 16, wherein the second control operation comprises:

determining the risk of collision with the rear object while operating the braking device when the rear object is detected; and controlling the steering device when it is determined that there is the risk of collision but when no object is detected in the left and right front areas.

* * * * *